W. V. TURNER.
FLUID PRESSURE BRAKE.
APPLICATION FILED JULY 29, 1913.

1,192,960.

Patented Aug. 1, 1916.
5 SHEETS—SHEET 1.

WITNESSES

INVENTOR
Walter V. Turner
by Wm. M. Cady
Att'y.

UNITED STATES PATENT OFFICE.

WALTER V. TURNER, OF EDGEWOOD, PENNSYLVANIA, ASSIGNOR TO WESTINGHOUSE AIR BRAKE COMPANY, OF WILMERDING, PENNSYLVANIA, A CORPORATION OF PENNSYLVANIA.

FLUID-PRESSURE BRAKE.

1,192,960.      Specification of Letters Patent.      Patented Aug. 1, 1916.

Application filed July 29, 1913. Serial No. 781,731.

*To all whom it may concern:*

Be it known that I, WALTER V. TURNER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a brake controlling valve mechanism.

In applying and releasing the brakes on railway trains, it is highly desirable to provide a brake controlling valve mechanism which has a maximum sensitiveness to release and a minimum sensitiveness to applying, so that the brakes may be readily released on long trains under a comparatively slow increase in train pipe pressure and at the same time are prevented from applying under inevitable fluctuations in train pipe pressure such as occasioned, for example, by variations between the opening and closing pressures in the operation of the train pipe feed valve, and furthermore, where the apparatus is designed to provide graduated release, it is desirable that the controlling valve parts respond with facility to light increases in train pipe pressure.

One object of my invention is therefore to provide an improved brake controlling valve mechanism which has a minimum sensitiveness to movement in applying the brakes and a maximum sensitiveness in releasing the brakes.

Another object of my invention is to provide a brake controlling valve mechanism having a minimum sensitiveness to movement from a normal brake release position and having another release position in which the controlling valve parts have a maximum sensitiveness to movement. The equalizing portion of a controlling valve device has a main slide valve and an auxiliary graduating valve having a movement relative to the main valve, and while ordinarily, as intended, the graduating valve will initially move relatively to the main valve in applying the brakes, it may sometimes happen that the graduating valve will stick so that both valves move together. When this occurs, the brake applying ports may not be properly opened, so that an application of the brakes may not be secured.

Another object of my invention is to provide an equalizing valve device having a main valve and a graduating valve and adapted to effect an application of the brakes when the graduating valve fails to move relatively to the main valve.

Another object of my invention is to provide an improved valve mechanism for effecting an emergency application of the brakes which has a maximum sensitiveness to a sudden rate of reduction in train pipe pressure.

Another object of my invention is to provide an improved emergency controlling valve mechanism responsive to a predetermined reduction in train pipe pressure and also having a high degree of sensitiveness to a sudden rate of reduction in train pipe pressure.

In the accompanying drawings; Fig. 7 a sectional view of the graduated release cap in the position for cutting out graduated release.

Figure 1:
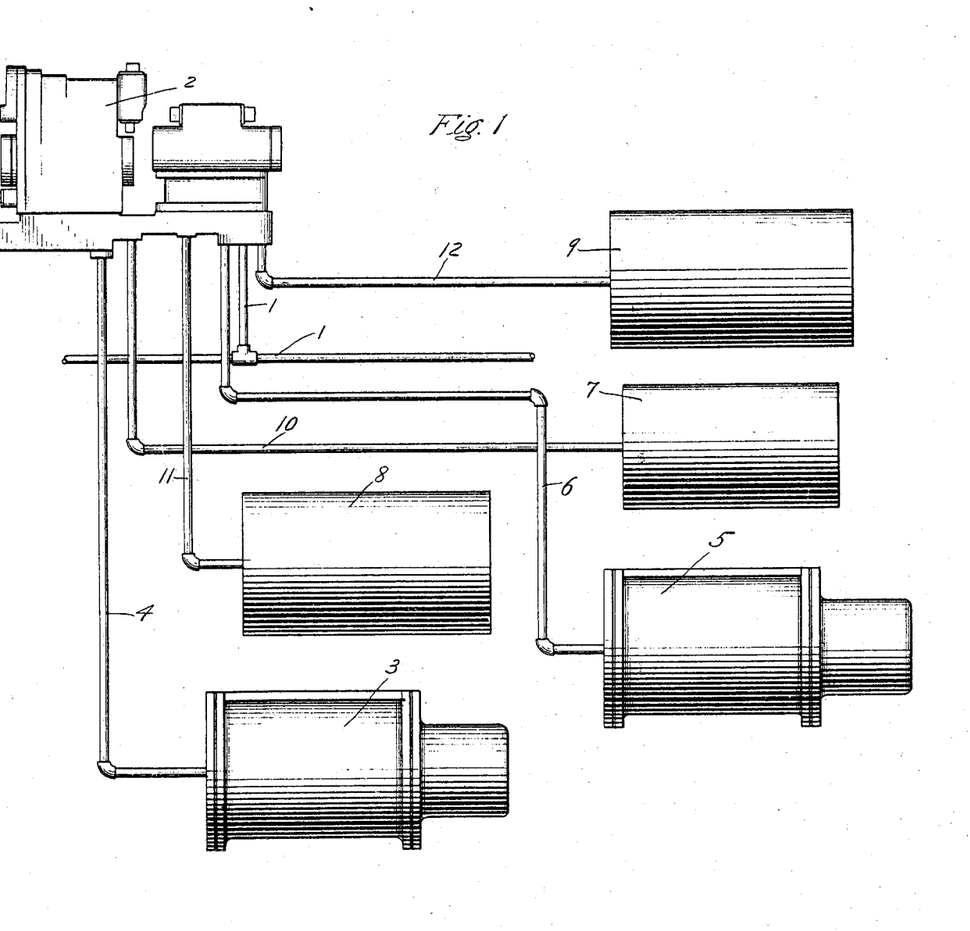
Figure 1 is a diagrammatic view of a car air brake equipment with my improvements applied thereto.

As shown in Fig. 1 of the drawings, the car air brake equipment may comprise a train pipe 1 connected to the brake controlling valve mechanism 2, a service brake cylinder 3 connected by pipe 4 and an emergency brake cylinder 5 connected by pipe 6 to the valve mechanism 2, an auxiliary reservoir 7, service reservoir 8, and emergency reservoir 9 connected to said valve mechanism by the respective pipes 10, 11, and 12.

In Figs. 2 to 6 inclusive is shown a brake controlling valve mechanism embodying my invention and comprising an equalizing portion having a piston chamber 13 connected to passage 14 leading to train pipe 1 and containing an equalizing piston 15. A valve chamber 16 on the opposite side of piston 15 is connected by a passage 17 with auxiliary reservoir pipe 10 and contains a main slide valve 18 and a graduating slide valve 19 mounted on the main slide valve and having a movement relative thereto.

Figures 1, 2:
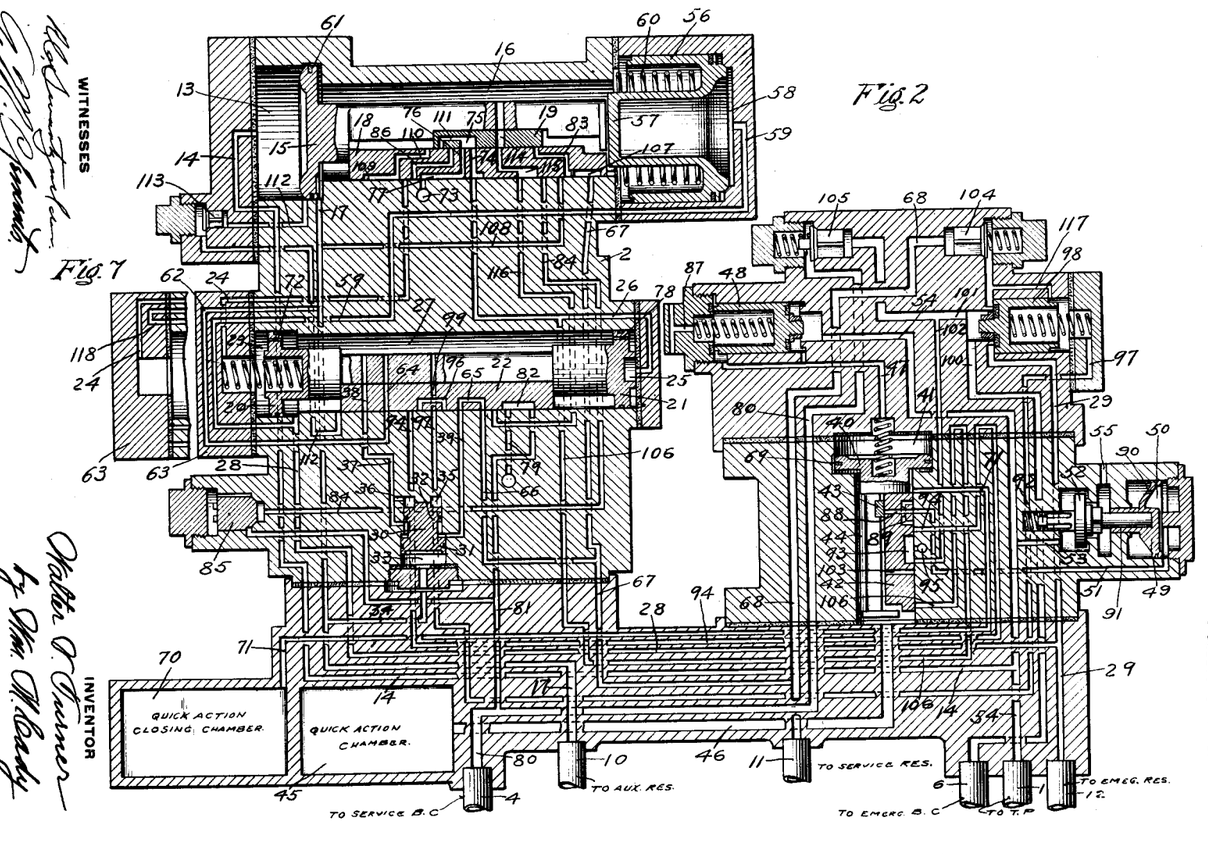
Fig. 2 a central sectional diagrammatic view of a valve mechanism for controlling the application and release of the brakes embodying my invention and showing the parts in the normal release position.

The equalizing valve device controls ports for supplying fluid to the brake cylinder and ports for varying the pressure on a separate release valve device comprising a double headed piston having piston heads 20 and 21 and a slide valve 22 operated by said piston. Chamber 23 at the outer face of piston head 20 communicates with a passage 24 leading to the seat of slide valve 18 and chamber 25 at the outer face of piston head 21 communicates with a passage 26 also leading to the seat of main slide valve 18. Valve chamber 27 intermediate the piston heads 20 and 21 is in open communication with passage 28 connected to passage 29 which leads to emergency reservoir pipe 12.

A charging valve device 30 is preferably employed for preventing the recharging of the large service reservoir 8 until the auxiliary reservoir 7 and emergency reservoir 9 have been recharged to within a few pounds, for example, five pounds, of the normal pressure carried.

The above mentioned charging valve device comprises differential piston heads 31 and 32, the chamber 33 at the outer face of piston head 31 being connected by passage 34 to auxiliary reservoir passage 17 and chamber 35 at the outer face of piston head 32 being connected by passages 36 and 37 with a port 38 in the release position of the release slide valve 22.

In the upper position of the charging valve device 30, the space intermediate the piston heads 31 and 32 establishes communication from passage 37 to a passage 39, through which the service reservoir 8 is recharged.

For controlling emergency applications of the brakes, an emergency valve mechanism is provided comprising a piston 40 contained in piston chamber 41 and a slide valve 42 and auxiliary slide valve 43 contained in valve chamber 44. The valve chamber 44 is connected to a quick action chamber 45 by passage 46 and piston chamber 41 is connected to passage 47 controlled by protection valve device 48. An emergency quick action valve device is also provided comprising a piston 49 having chamber 50 at its outer face communicating with passage 51 leading to the seat of emergency slide valve 42 and a valve 52 operated by said piston 49 for opening communication from passage 53 leading to train pipe passage 54 to an atmospheric exhaust port 55.

The release position of the equalizing valve device is determined by a piston stop device 56 having a central stem 57 adapted to engage the end of the main slide valve 18. The piston stop device 56 has a chamber 58 at one side which communicates with a passage 59 leading to emergency reservoir passage 28 and the opposite side of the piston device is open to the valve chamber 16. The piston device is adapted to seat in its opposite extreme positions and a spring 60 assists the fluid pressure in valve chamber 16 in holding the piston stop device at its outer seat.

In operation, when fluid under pressure is supplied to the train pipe 1, fluid flows through passages 54 and 14 to piston chamber 13, forcing the equalizing piston 15 to full release position, and through feed groove 61 around piston 15 to valve chamber 16. From valve chamber 16 fluid flows through passage 17 and charges the auxiliary reservoir and also through passage 62 branching from passage 17, when the graduated release cap 63 is in the position shown in Fig. 2, to port 64 in the release slide valve 22, thus charging the valve chamber 27.

The emergency reservoir 9 is charged through passage 112 past charging check valve 113 to valve chamber 27 and thence through passage 28 to the emergency reservoir 9, and the service reservoir 8 is charged through port 38, passage 37, around the charging valve 30 to passage 39 and thence, when the release valve device is in release position through cavity 65 and passages 66, 67 and 68 to service reservoir pipe 11. Fluid from the train pipe also flows through passage 54 to the protection valve device 48 and when the train pipe pressure exceeds a predetermined degree, the protection valve device is shifted to the position shown in Fig. 2 of the drawings, so that communication is opened from passage 54 to passage 47 leading to emergency piston chamber 41. Fluid then flows through feed groove 69 around the emergency piston 40 and charges valve chamber 44 and also quick action chamber 45. Quick action closing chamber 70 is charged from valve chamber 44 through passage 71.

In the normal release position of the equalizing valve device, passage 24 is blanked, so that fluid pressure equalizes through an equalizing port 72 in the piston head 20 from valve chamber 27 of the release valve device into piston chamber 23. Passage 26 leading to piston chamber 25 is connected to an atmospheric exhaust port 73 through port 74, cavity 75 in graduating valve 19 and port 76 and cavity 77 in the main slide valve 18. As fluid pressure in piston chamber 23 opposes atmospheric pressure in piston chamber 25, the release valve device is shifted to release position, as shown in Fig. 2 of the drawings. The piston head 21 is also provided with an equalizing port 78, but as the piston head 21 is adapted to seat around the port opening of passage 26, escape of fluid from valve chamber 27 to the atmosphere is prevented.

In the release position of the release valve device, the service brake cylinder 3 is connected to the service brake cylinder exhaust port 79 through pipe 4, passages 80 and 81, and cavity 82 in the release slide valve 22.

Figure 3:
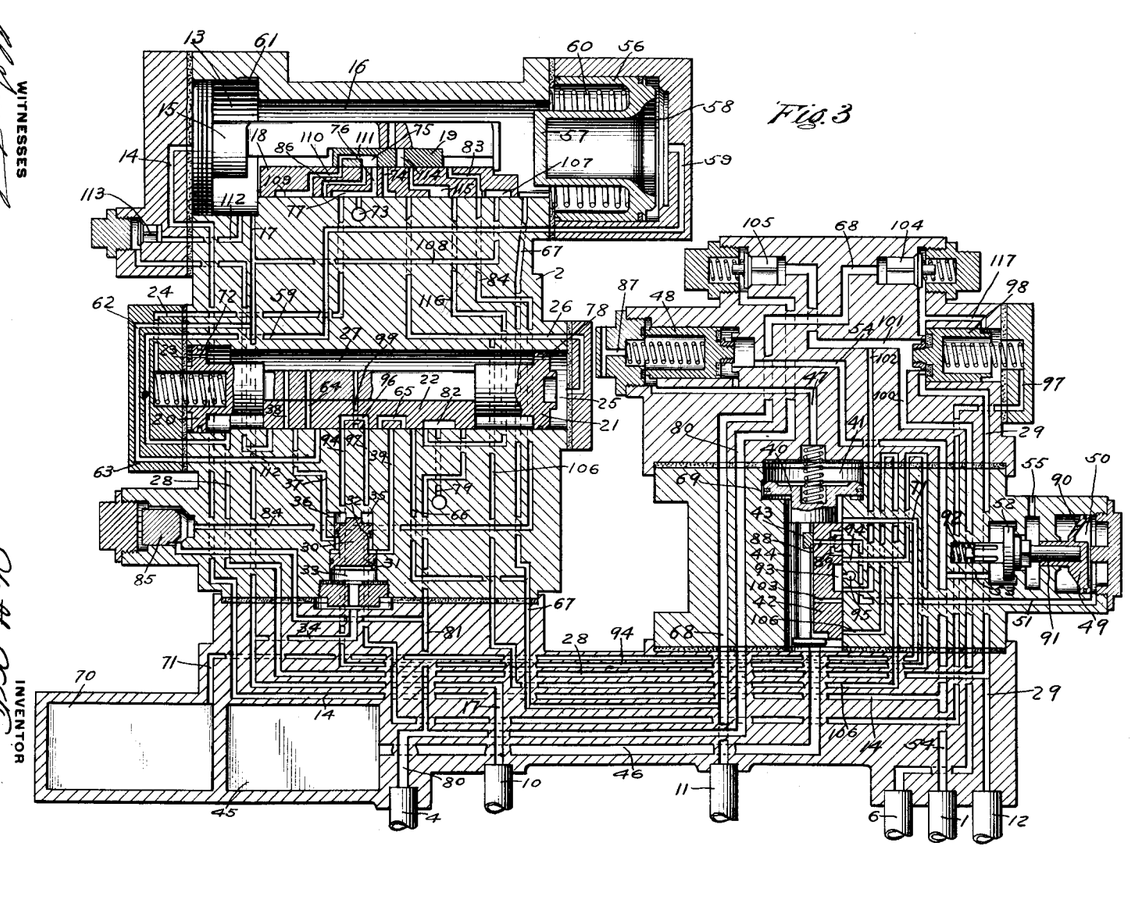
Fig. 3 a view similar to Fig. 2, showing the parts in service application position.
Figure 4:
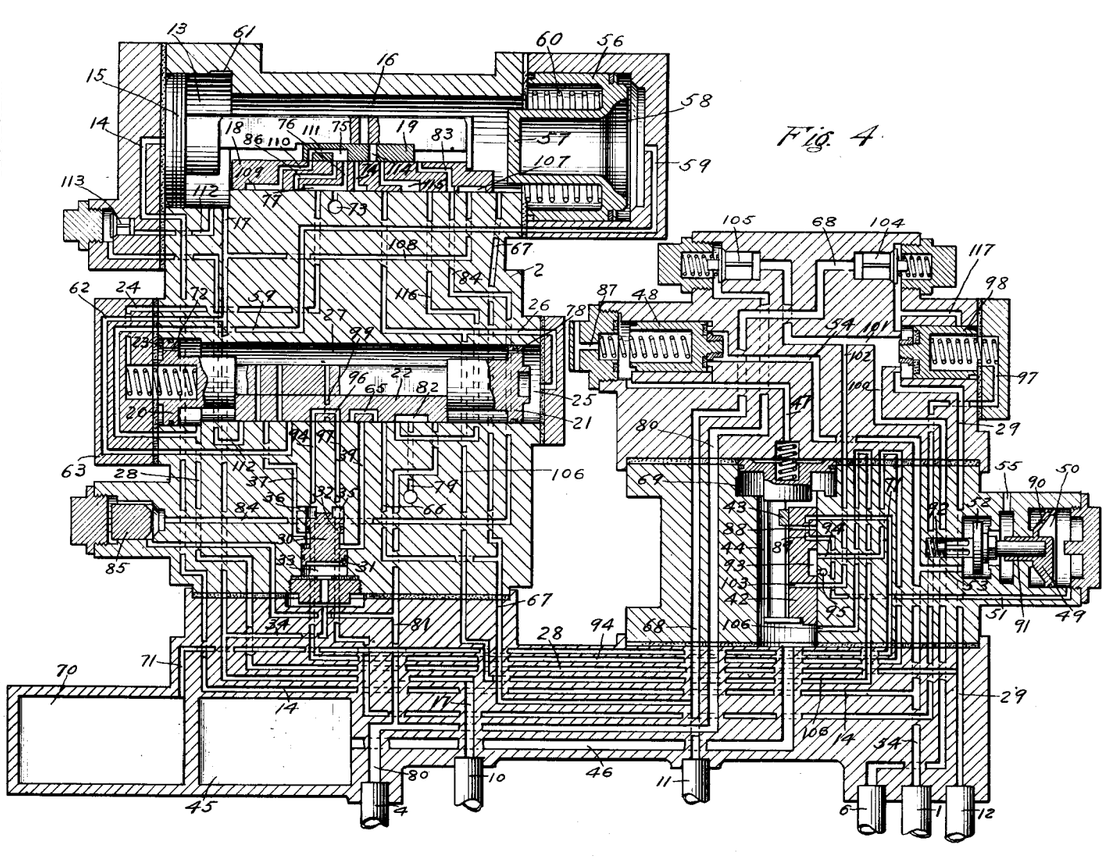
Fig. 4 a similar view, showing the parts in emergency application position.

In order to effect a service application of the brakes, the train pipe pressure is reduced and thereby the equalizing valve parts are shifted to application position, as shown in Fig. 3 of the drawings. The first movement of the equalizing piston 15 toward service application position closes the feed groove 61 and the emergency reservoir charging port 112 and connects a resistance increasing cavity 109 with the atmosphere through port 110, port 111 and cavity 75 in the graduating valve 19, and port 76 to exhaust port 73. The employment of the resistance increasing cavity insures that very light train pipe reductions, say below five pounds, will not be sufficient to move the slide valve and cause a brake application.

In this position, service port 83 is brought into register with passage 84 and is uncovered by the movement of the graduating valve 19. Fluid then flows from valve chamber 16 through passage 84, past check valve 85 to passage 81 and thence to the service brake cylinder 3. In service application position, the passage 26 is blanked by the main slide valve 18, while passage 24 is connected to exhaust port 73 through cavity 77 so that the fluid pressure previously equalized into that portion of piston chamber 25 which is outside of its seat operates to shift the release valve device so as to close the brake cylinder exhaust, as shown in Fig. 3. The piston head 20 is adapted to seat around the port opening of passage 24, so that escape of fluid under pressure from valve chamber 27 to the atmosphere is prevented. When the equalizing valve device is in full application position, the service reservoir passage 67 is uncovered by the main slide valve 18, so that fluid is supplied from both the auxiliary reservoir and the service reservoir in making service applications. The principal purpose of dividing the supply for service applications into two volumes is to provide a small reservoir volume open to the valve chamber 16 in release position, so that in graduating the release of the brakes, the graduated release reservoir has only a small volume to equalize into, thereby providing a very flexible graduated release with a minimum emergency reservoir volume, as the graduated release feature is controlled by the expansion of emergency reservoir air into the auxiliary reservoir volume and this arrangement also provides a smaller volume for the emergency reservoir to equalize into.

In making a service application of the brakes, as chamber 58 at the outer face of piston 56 is constantly open through passage 59 to emergency reservoir pressure, it will be seen that the reduction in auxiliary reservoir pressure on the opposite side of the piston by flow to the brake cylinder permits the higher emergency reservoir pressure to shift the piston 56 to its inner seat, as shown in Fig. 3 of the drawings.

Figure 5:
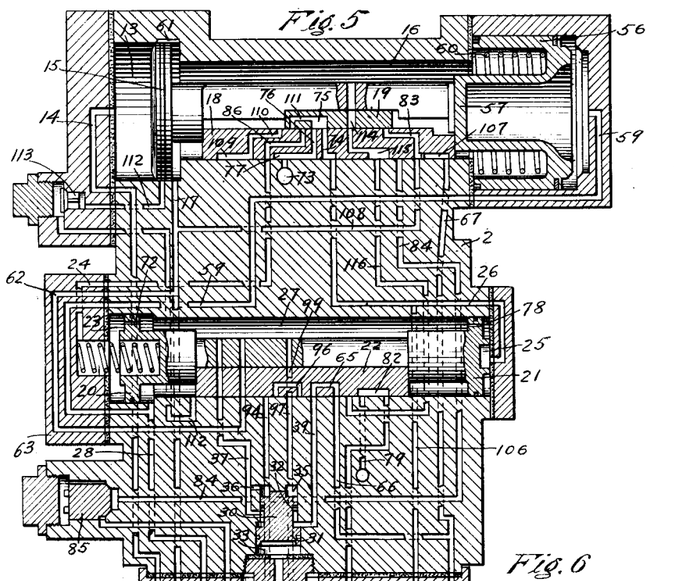
Fig. 5 a similar view with the emergency portion broken away, showing the parts in graduated release position.
Figure 6:
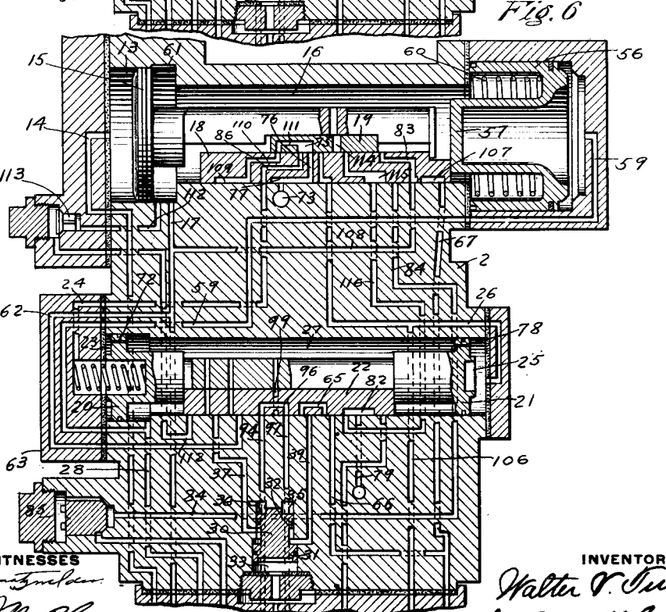
Fig. 6 a view similar to Fig. 5, showing the parts in graduated release lap position.

If a graduated release of the brakes is desired, a gradual increase in train pipe pressure is made and the equalizing valve device is thereupon moved inwardly until the main slide valve 18 strikes the stem 57. In this position, as shown in Fig. 5, a foot extension of port 74 registers with passage 26 and cavity 77 registers with exhaust port 73, while ports 74 and 76 are connected by cavity 75 in the graduating valve 19. Fluid under pressure is therefore vented from release piston chamber 25 and as passage 24 leading to release piston chamber 23 is blanked, the fluid pressure in chamber 23 operates to shift the release valve device to release position, so that the brake cylinder is connected with exhaust port 79.

In the release position of the release slide valve 22, port 64 registers with passage 62, so that fluid at emergency reservoir pressure is supplied from valve chamber 27 to equalizing valve chamber 16. Upon an increase in pressure in the valve chamber 16 by flow from the emergency reservoir to a degree slightly exceeding the train pipe pressure, the equalizing piston 15 is shifted and the graduating valve 19 is moved outwardly to the position shown in Fig. 6 of the drawing, in which the port 74 is blanked, and in which cavity 75 connects port 76 with a port 86 registering with passage 24. Fluid is thereupon vented from release piston chamber 23 and since passage 26 is now blanked, the fluid pressure in piston chamber 25 operates to shift the release valve device so as to close the brake cylinder exhaust. This operation of releasing a portion of the fluid from the brake cylinder may be repeated as desired by making further gradual increases in train pipe pressure, as will be evident, until the emergency reservoir pressure nearly equalizes with the pressure in valve chamber 16 when the spring 60 operates to return the piston 56 to release position and the equalizing valve parts are free to return to normal release position.

If it is desired to make a full release of the brakes after a service application, the train pipe pressure is restored to normal pressure. This increase in train pipe pressure forces the equalizing valve device toward normal release position but the parts are at first stopped in the graduated release position by the graduated release piston 56. In this position, the feed groove 61 and the emergency reservoir charging port 112 are closed, thus preventing train pipe air from flowing either to the auxiliary reservoir or the emergency reservoir.

Passage 24 is blanked by the graduating valve 19 and passage 26 leading to release piston chamber 25 is open to the atmosphere through port 74, cavity 75 in the graduating valve 19 and port 76 and cavity 77 in the main slide valve and exhaust port 73. The release valve device is then forced to release position by the fluid pressure in piston chamber 23, opening the service brake cylinder to the exhaust through passage 81, cavity 82 and exhaust port 79.

The first movement of the equalizing piston 15 toward release position makes connection from valve chamber 16 through port 114 in the graduating valve 19 and port 115 in the main slide valve 18 with passage 116 and as this passage is connected by cavity 82 in the release slide valve 22 with exhaust port 79, fluid is vented from the auxiliary reservoir and a slight reduction in auxiliary reservoir pressure is effected which insures the prompt movement of the parts to graduated release position and obviates any tendency of the parts to stop before the release piston passage 26 is fully open. Emergency reservoir air can now flow back through port 64 and passages 62 and 17 to the valve chamber 16 and the auxiliary reservoir and when the auxiliary reservoir has been recharged from the emergency reservoir to within five pounds of the emergency reservoir pressure, the charging valve 30 is opened by the auxiliary reservoir pressure in chamber 33, permitting the service reservoir to recharge as hereinbefore described. When the reduction in emergency reservoir pressure thus effected has nearly equalized the opposing fluid pressures on the graduated release piston 56, the same is shifted by its spring 60 to release position, the equalizing piston 15 with the slide valves 18 and 19 following, so that all the parts are returned to full release position.

In order to illustrate certain features of my invention, two brake cylinders are shown, although it will be understood that only one brake cylinder need be employed so far as many features of my invention are concerned.

In order to effect an emergency application of the brakes, a sudden reduction in train pipe pressure is made, which causes the equalizing valve parts to be shifted to application position the same as in service and the release valve device to the position closing the brake cylinder exhaust. In addition, the train pipe pressure reducing to a predetermined degree permits the protection valve device 48 to move out and thereby open communication from passage 47 to an exhaust port 87. Fluid is thereupon vented from the emergency piston chamber 41 and the emergency piston 40 is thus shifted outwardly. According to the present construction, a graduating valve 43 is moved by the initial movement of the emergency piston, so as to uncover a port 88 in the slide valve 42. Fluid is thereupon supplied from valve chamber 44 and the quick action chamber 45 through the registering passage 51 to quick action piston chamber 50. The quick action piston 49 is thereby shifted to open the train pipe vent valve 52, so as to effect a local reduction in train pipe pressure and produce quick serial action in the usual manner. Upon further movement of the emergency piston, the slide valve 42 is shifted, so that the passage 51 is connected by cavity 89 with passage 71. Fluid under pressure in the closing chamber 70 is then supplied to quick action piston chamber 50 and this holds the piston in open position until the fluid in the closing chamber has all escaped through the small port 90 in the quick action piston to the exhaust port 55, the piston stem 91 being a loose fit to permit such escape. The quick action parts are then moved to the closed position by the action of spring 92. In emergency position, a cavity 93 in emergency slide valve 42 connects passage 94 with an exhaust port 95 and passage 94 is connected by cavity 96 in the release slide valve 22 with passage 97 leading to one side of a valve piston 98. Fluid is thus vented from said valve piston. Before proceeding, it may be well to explain that in the normal release position of the parts, passage 97 is connected by a port 99 in the release slide valve with valve chamber 27, so that emergency reservoir fluid is supplied to the valve piston 98 at one side. The opposite side of the valve piston is open to the emergency brake cylinder 5 through passage 100 and as passage 100 is connected by passages 101 and 102 through cavity 93 with exhaust port 95, the emergency brake cylinder as well as the inner face of the valve piston 98 is at atmospheric pressure and the pressure on the opposite side of the valve chamber maintains the valve piston in its closed position.

A small emergency port 117 leads from passage 29 to the chamber at the outer face of valve piston 98, so as to insure the maintenance of fluid pressure therein against possible leakage.

In emergency position of the emergency slide valve 42, passage 102 is connected by port 103 with valve chamber 44, so that the pressure in quick action chamber 45 acts on valve piston 98 and assists in opening the same. As soon as the valve piston 98 lifts from its seat, fluid from the emergency reservoir 9 is supplied through passage 29 to the brake cylinder and also from the service reservoir 8 through passage 68 past check valve 104. Fluid also flows to the service brake cylinder 3 from passage 101 past check valve 105 to passage 80. Thus fluid is quickly supplied through large passages directly to both brake cylinders from the service and emergency reservoirs in an emergency application of the brakes.

In order to assist in maintaining the fluid pressure in the quick action chamber, a passage 106 leading from passage 26 is uncovered by the movement of the emergency slide valve 42, so that fluid equalizing through the equalizing port 78 from valve chamber 27 is supplied to the quick action chamber.

The emergency piston 40 remains in emergency position until the train pipe pressure is increased to release the brakes, the protection valve device 48 being then shifted when the train pipe pressure is increased to a predetermined degree to open communication from the train pipe to the emergency piston chamber 41. The emergency valve device being returned to normal release position, the valve piston 98 is moved to the closed position and the emergency brake cylinder is connected to exhaust port 95. The equalizing valve device is also shifted to release position in the manner hereinbefore described in connection with releasing after a service application of the brakes.

It may sometimes happen that the graduating valve of the equalizing valve device will offer more resistance to movement than the main slide valve and in order to insure that fluid will be supplied to the brake cylinder even if such should be the case, one feature of my invention consists in providing a cavity 107 in the main slide valve which is adapted upon movement of the main slide valve to connect brake cylinder passage 84 with a passage 108 leading to auxiliary reservoir passage 17. Fluid under pressure from the auxiliary reservoir is thus supplied to the service brake cylinder. The movement of the equalizing valve device also causes the cavity 77 to connect passage 24 with exhaust port 73, so that the release valve device is operated to close the brake cylinder exhaust as before described. It will now be evident that with the above described feature, an application of the brakes is secured, even if the equalizing piston should move the main valve without causing the usual relative movement of the graduating valve to open the usual service port.

It will be noted that action of the graduated release piston 56 in holding the equalizing valve parts at graduated release position operates to prevent the recharging of the auxiliary, service, and emergency reservoirs from the train pipe until the emergency reservoir pressure has nearly equalized with the other reservoir pressures and thus the movement of the equalizing pistons throughout the train to release position is insured before any reservoir recharging takes place. Thus the graduated release piston may be employed to accomplish a purpose similar to that of the charging valve 30, although the latter is preferred as the operation of same is not dependent upon a spring.

If it is desired to cut out graduated release, the graduated release cap 63 is shifted to the position shown in Fig. 7, in which the emergency reservoir passage 62 is blanked and the passage 59 is connected by cavity 118 therein with auxiliary reservoir passage 17. As the pressure in chamber 58 is now maintained at the same pressure as that acting on the opposite side of the piston 56, it will be evident that the spring 60 will hold the piston in the normal release position at all times.

The protection valve 48 operates when the train pipe pressure has been reduced to a predetermined degree and thus may not operate under sudden reductions in train pipe pressure of slight amount. It is desirable that an emergency application of the brakes may be secured upon any sudden reduction in train pipe pressure even where the reduction is only three to five pounds in amount. In order to insure the obtaining an emergency application of the brakes under any sudden reduction in train pipe pressure, the emergency graduating valve 43 is employed. A service rate of reduction in train pipe pressure will not move the emergency piston 40, as the capacity of the feed groove 69 is sufficient to provide for same, but a sudden reduction in train pipe pressure exceeding the predetermined service rate of reduction causes the movement of the emergency piston and since it is only necessary to move the graduating valve 43 to initiate quick action, it will be seen that substantially any sudden reduction in train pipe pressure even as slight as three pounds will cause quick action and an emergency application of the brakes.

Having now described my invention, what I claim as new and desire to secure by Letters Patent, is:—

1. In a fluid pressure brake, the combination with a train pipe, of a valve device subject to variations in train pipe pressure and having a normal release position and two other positions, movement between which effects the graduated release of the brakes and means for defining the graduated release position.

2. In a fluid pressure brake, the combination with a train pipe, of a valve device subject to variations in train pipe pressure for controlling the release of the brakes and having a normal release position and a position for graduating the release of the brakes and means for preventing movement of said valve device from the graduated release position to the normal release position.

3. In a fluid pressure brake, the combination with a train pipe, of a valve device subject to variations in train pipe pressure for controlling the release of the brakes and having a normal release position and a position for graduating the release of the brakes and means operating upon an application of the brakes for defining the graduated release position.

4. In a fluid pressure brake, the combination with a train pipe, of a main valve controlling the release of the brakes in one position, an auxiliary valve for controlling the release of the brakes in another position, a piston subject to variations in train pipe pressure for operating said valves, and means operating upon a reduction in train pipe pressure for defining the release position in which the release is controlled by the auxiliary valve.

5. In a fluid pressure brake, the combination with a train pipe, of a main valve movable from one release position for effecting the closure of the brake cylinder exhaust, an auxiliary valve movable from another position for effecting the closure of the brake cylinder exhaust, and a piston subject to variations in train pipe pressure for operating said valves, and a stop device for temporarily preventing movement of the parts from the second release position to the first.

6. In a fluid pressure brake, the combination with a train pipe, of a valve device comprising a main valve, an auxiliary valve, and a piston subject to variations in train pipe pressure for operating said valves to effect the release of the brakes, the main valve being adapted to effect the closure of the brake cylinder exhaust upon movement of said valve device from one release position and the auxiliary valve upon movement from another release position, and means for preventing movement of the valve parts from the second release position to the first.

7. In a fluid pressure brake, the combination with a train pipe, of a valve device for controlling the release of the brakes comprising a main valve controlling ports for effecting the release of the brakes in one position of the valve device, an auxiliary valve controlling ports for effecting the release of the brakes in another position of the valve device, a piston subject to variations in train pipe pressure for operating said valves, and means operated upon an application of the brakes to form a stop for limiting the movement of the valve device to the release position of the auxiliary valve in releasing the brakes.

8. In a fluid pressure brake, the combination with a train pipe, of a valve device subject to variations in train pipe pressure for controlling the application and release of the brakes and having two positions in which the brake cylinder is open to the exhaust and means operated upon an application of the brakes to form a stop to limit the movement of said valve device in releasing the brakes to one of said release positions.

9. In a fluid pressure brake, the combination with a train pipe and auxiliary reservoir, of an equalizing valve device subject to the opposing pressures of the train pipe and auxiliary reservoir, for controlling the application and release of the brakes and having a normal release position and a piston operated upon a reduction in auxiliary reservoir pressure in applying the brakes for preventing the movement of said equalizing valve device to said normal release position in releasing the brakes.

10. In a fluid pressure brake, the combination with a train pipe, of an equalizing valve device comprising a main valve having a normal release position, an auxiliary valve mounted on the main valve and having a movement relative to the main valve for controlling the release of the brakes in another position of the main valve, and a piston subject to variations in train pipe pressure for operating said valves, and means movable upon applying the brakes to a position for holding the main valve in the second release position and for preventing movement of said valve to said normal release position upon releasing the brakes.

11. In a fluid pressure brake, the combination with a train pipe, of an equalizing valve device subject to variations in train pipe pressure for controlling the brakes, a reservoir adapted to be charged in the normal release position of the equalizing valve device, an additional reservoir normally charged with fluid under pressure, and means for holding said equalizing valve device in another position for releasing the brakes until fluid pressure in said additional reservoir has substantially equalized with the fluid pressure in the first mentioned reservoir.

12. In a fluid pressure brake, the combination with a train pipe, of an equalizing valve device subject to variations in train pipe pressure for effecting an application of the brakes and a release valve device comprising a valve for controlling a brake cylinder exhaust port and a piston having two piston heads for operating said valve, the equalizing valve device controlling ports for varying the fluid pressure on said heads.

13. In a fluid pressure brake, the combination with a train pipe, of an equalizing valve device subject to variations in train pipe pressure for effecting an application of the brakes and a release valve device comprising a valve for controlling a brake cylinder exhaust port and a piston having two piston heads provided with equalizing ports tending to normally maintain the fluid pressures equal on opposite sides of said heads, the equalizing valve device controlling ports for venting fluid from each piston head to thereby operate the release valve device.

14. In a fluid pressure brake, the combination with a train pipe, of an equalizing valve device subject to variations in train pipe pressure, a source of fluid pressure, and a release valve device for controlling the release of fluid from the brake cylinder, the equalizing valve device controlling ports for varying the pressure on said release valve device for operating same to open and close the brake cylinder exhaust and the release valve device controlling means for venting fluid from the source of pressure to one side of the equalizing valve device to operate the equalizing valve device and thereby the release valve device to close the brake cylinder exhaust.

15. In a fluid pressure brake, the combination with a train pipe, of a release valve device for controlling the exhaust of fluid from the brake cylinder and an equalizing valve device operated upon an increase in train pipe pressure for effecting the movement of said release valve device to open the brake cylinder exhaust and means controlled by said release valve device for effecting the movement of the equalizing valve device to a position for causing the movement of the release valve device to close said brake cylinder exhaust.

16. In a fluid pressure brake, the combination with a train pipe, of a release valve device comprising a valve for controlling the release of fluid from the brake cylinder, a piston having two piston heads for operating said valve, said heads having equalizing ports for permitting equalization of fluid pressures from the chamber intermediate the piston heads to the piston chambers at the outer faces of said heads, and an equalizing valve device operated upon a reduction in train pipe pressure for venting fluid from one piston head to operate the release valve device for closing the brake cylinder exhaust and operated upon an increase in train pipe pressure for venting fluid from the other piston head to operate said release valve device for opening the brake cylinder exhaust.

17. In a fluid pressure brake, the combination with a train pipe, of an equalizing valve device comprising a main valve and an auxiliary valve for controlling ports for effecting a service application of the brakes and a piston subject to train pipe pressure for operating said valve, the main valve having means for effecting a service application of the brakes independently of the auxiliary valve.

18. In a fluid pressure brake, the combination with a train pipe, of an equalizing valve device comprising a piston subject to train pipe pressure, a main valve and an auxiliary valve having a movement relative to the main valve and operated by said piston upon a gradual reduction in train pipe pressure for opening a port for effecting an application of the brakes, the main valve being also adapted to open a port for effecting a service application of the brakes independently of the auxiliary valve.

19. In a fluid pressure brake, the combination with a train pipe, of an emergency valve device comprising a main valve, an auxiliary valve having a movement relative to the main valve for effecting an emergency application of the brakes, and a piston operated upon a sudden reduction in train pipe pressure for controlling said valves.

20. In a fluid pressure brake, the combination with a train pipe, of means for effecting an emergency application of the brakes, an emergency valve device comprising a main valve, an auxiliary valve having a movement relative to the main valve for controlling said means, and a piston operating upon a sudden reduction in train pipe pressure for operating said valves.

21. In a fluid pressure brake, the combination with a train pipe, of means for effecting an emergency application of the brakes, an emergency valve device comprising a main valve, an auxiliary valve having a movement relative to the main valve for controlling said means, and a piston adapted upon a sudden reduction in train pipe pressure to first operate said auxiliary valve for varying the fluid pressure on said means to operate the same and then actuate the main valve for maintaining said means in the operative position.

22. In a fluid pressure brake, the combination with a train pipe, of an equalizing valve device comprising a piston subject to train pipe pressure, a main valve and an auxiliary valve having a movement relative to the main valve and operated by said piston upon a gradual reduction in train pipe pressure for effecting a service application of the brakes, and means controlled by the main valve for effecting a service application of the brakes upon failure of the auxiliary valve to move relatively to the main valve.

In testimony whereof I have hereunto set my hand.

WALTER V. TURNER.

Witnesses:
A. M. CLEMENTS,
S. W. KEEFER.